UNITED STATES PATENT OFFICE.

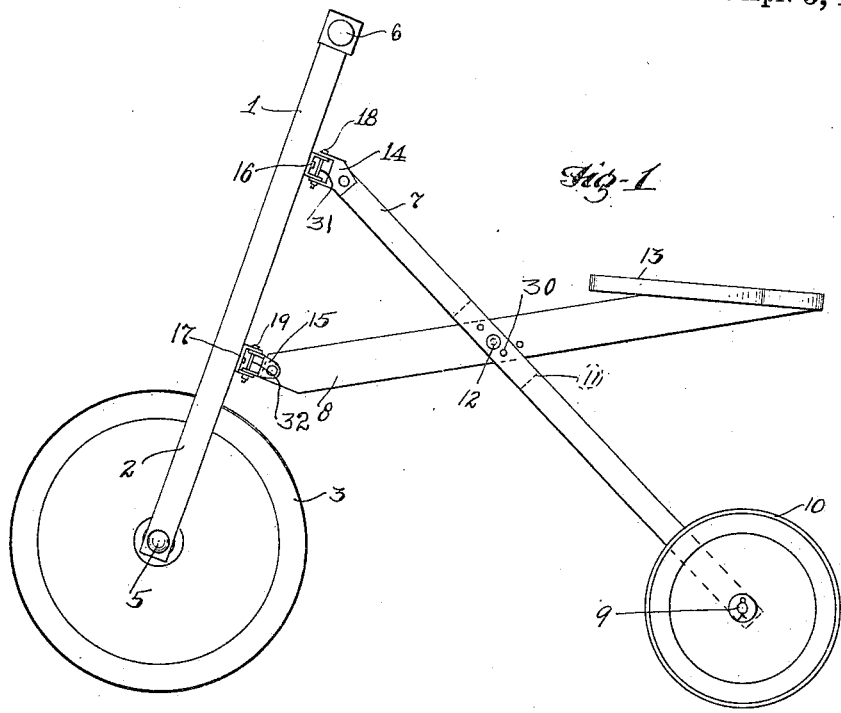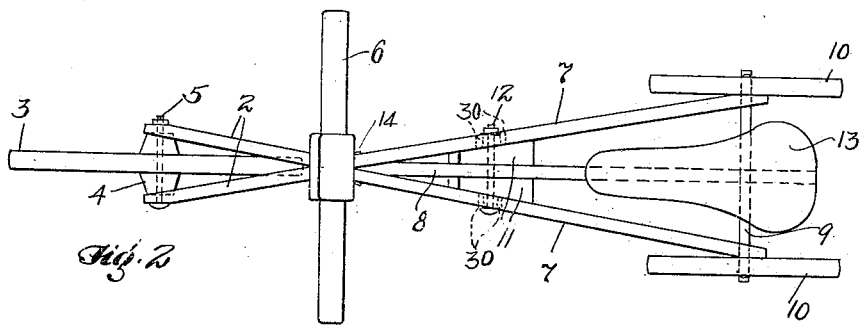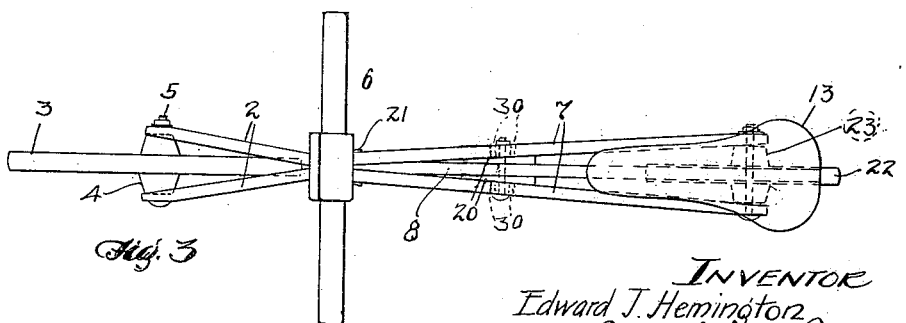

EDWARD J. HEMINGTON, OF LAKEWOOD, OHIO.

CHILD'S VEHICLE.

1,373,814. Specification of Letters Patent. Patented Apr. 5, 1921.

Application filed March 21, 1919. Serial No. 284,123.

*To all whom it may concern:*

Be it known that I, EDWARD J. HEMINGTON, a citizen of the United States, and a resident of Lakewood, county of Cuyahoga, and State of Ohio, have invented a new and useful Improvement in Children's Vehicles, of which the following is a specification, the principle of the invention being herein explained, and the best mode in which I have contemplated applying that principle so as to distinguish it from other inventions.

The present invention, which relates to children's vehicles, is particularly concerned with the manufacture of an improved type of inexpensive and very simple two or three-wheel vehicle which may be used by small children. A further object of the invention is to provide a vehicle of this type having the general construction, and even the appearance of a bicycle or velocipede, but lacking the pedals and the accompanying complication, which permits it to be manufactured entirely of wood and in a very inexpensive way. A still further object of the invention is to construct such vehicle so as to permit it to be readily taken down for convenience in storage and shipping. Another object of the invention is the provision of a frame construction adaptable with but slight changes to either a two or three wheel vehicle. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a side elevation of my improved vehicle; Fig. 2 is a plan view of the same; and Fig. 3 is a second plan view illustrating the modification of the invention. The vehicle shown in Figs. 1 and 2 consists of a front frame member 1, provided with a fork 2, between the parts of which is mounted a wheel 3. This front wheel of the vehicle is formed with integral hubs 4 extending on either side into a running contact with the inner faces of the members of the fork 2, and is carried upon a suitable axle in a form of a bolt 5. At the upper end of the forward frame member is disposed a straight handle 6.

Extending rearwardly from the front member of the frame are two members 7 and 8, of which the member 7 is built up of two individual strips which diverge rearwardly in order to extend to the ends of a rear axle member 9, upon which are mounted rear wheels 10 in much the same manner as is common in velocipedes. The member 8 extends at a slight angle to the horizontal between the two parts of the members 7 where it is mounted against filler strips 11, which, together with the member 8 are pivotally secured together by means of a removable bolt 12. The upper rearward end of the member 8 is mitered off to form a horizontal surface, upon which is mounted a flat seat 13.

The general construction of the vehicle will be readily understood from the foregoing description of Figs. 1 and 2 and is not in itself any great departure from that which has been used in the past except that the construction is designed to permit of wooden parts throughout. The vehicle is also designed to allow it to be very easily assembled and taken apart and the members 7 and 8 are removably connected to the forward frame member 1. This connection is by means of clamps 14 and 15 fastened over the forward ends of the members 7 and 8, respectively, and engaging with brackets 16 and 17, respectively on the member 1. The extending portions of the brackets and of the clamps are provided with registering apertures, in which engage easily removable bolts 18 and 19, respectively. In addition to this removable connection, each of the members 7 and 8 is pivotally mounted in the respective brackets 14 and 15 about horizontal axes 31 and 32, respectively. When the various parts of the vehicle are manufactured the parts 7 and 8 are first pivotally connected together by means of the bolt 12, and are provided of course with the clamps 14 and 15, while the frame member 1 is provided with the brackets 16 and 17. After then being assembled for testing the bolts 18 and 19 are removed, and for packing or storing the parts 1, 7 and 8 may be disposed parallel in a very compact bundle which takes up much less room than would be the case if the machine had to be crated or stored in its assembled condition.

The members 7 and 8 may be adjustably connected in a simple manner by positioning the connecting bolt 12 in any one of the holes 30 formed in the member 7 which conveniently provides several different seat elevations without any other material change in the vehicle, although this adjustment changes very slightly the pivotal relation between the members 7 and 8, and between each of these members and the member 1. This change, however, is insufficient to change the appearance or action of the vehicle in any way.

Another important advantage of the present construction is that it lends itself very easily to the manufacture of either a two-wheel or three-wheel vehicle. The members 1, 7 and 8 are the same whether used in a two-wheel or three-wheel vehicle, and these may be made up in large quantities of exactly the same dimensions and shapes. Then if it is desired to make a two-wheel vehicle, smaller and narrower filler strips 20 are fastened to the inside of the two members 7 and the forward ends of these two members are beveled off at a slightly smaller angle than will be found in the form shown in Fig. 2, while a clamp 21 of slightly different construction may be used to secure these two forward ends together. The use of thinner filler strips 20 will bring the rear ends of the two members 7 somewhat closer together, and between them may be inserted a single rear wheel 22 of substantially the same construction as the forward wheel 3, although of smaller size. This wheel 22 is provided with rounded extending hubs 23 which fill the space between the ends of the frame members 7, as indicated in Fig. 3. The forward and rear frame members are then assembled in exactly the same manner.

My improved vehicle is not only very inexpensive to manufacture but as it is made wholly of wood, with the exception of axle, bolts, clamps, brackets and cotter keys on the axles, it can easily be repaired, and constitutes an extremely inexpensive velocipede without pedals.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle of the character described, the combination of a front frame member, a wheel mounted therein and a steering handle attached thereto, two rear frame members, both being pivotally and removably attached to said front member, said two members being adjustably connected together, the adjustment being effected by swinging one of said members about its point of pivotal connection to said front frame member, a seat mounted on one of said members and rear wheels mounted on the other.

2. In a wheel of the character described, the combination of a front frame member, a wheel mounted therein and a steering handle attached thereto, spaced frame members pivotally attached to said front frame member, a rear wheel mounted in said spaced members, and a seat-carrying member pivotally attached to said front frame member about an axis alined with the axis of said spaced members, said seat-carrying member being adjustably connected to said spaced members, the adjustment being effected by swinging such seat-carrying member about its point of pivotal connection to said front frame member.

3. In a wheel of the character described, the combination of a front frame member, a wheel mounted therein and a steering handle attached thereto, spaced frame members pivotally attached to said front frame member, a rear wheel mounted in said spaced members, and a seat-carrying member pivotally attached to said front frame member about an axis alined with the axis of said spaced members, said seat-carrying member being attached to said front frame member below the point of attachment of said spaced members, and extending rearwardly between said spaced members and being adjustably attached thereto, the adjustment being effected by swinging such seat-carrying member about its point of pivotal connection to said front frame member.

4. In a vehicle of the character described, the combination of a front frame member provided with a wheel receiving fork, a wheel mounted in such fork, a steering handle attached to said member, a seat carrying member pivotally attached to said front member and also pivotally mounted about a horizontal axis, spaced rear frame members also pivotally attached to said front frame member about an axis alined with the axis of said seat carrying member, said spaced members carrying a rear wheel and being adjustably attached to said seat carrying member.

5. In a vehicle of the character described, the combination of a front frame member provided with a wheel receiving fork, a wheel mounted in such fork, a steering handle attached to said member, a seat carrying member pivotally attached to said front member, diverging rear frame members also pivotally attached to said front frame member about a single axis alined with the axis of said seat carrying member, angular filling blocks mounted on the adjacent faces of said diverging members, said seat member being securely fastened against and between said filling blocks and diverging frame members, and wheels carried by said diverging members.

6. In a vehicle of the character described, the combination of a front frame member provided with a wheel receiving fork, a wheel mounted in such fork, a steering handle attached to said member, a seat carrying member pivotally attached to said front member, diverging rear frame members also pivotally attached to said front frame member about a single axis alined with the axis of said seat carrying member, angular filling blocks mounted on the adjacent faces of said diverging members, said seat member being securely fastened against and between said filling blocks and diverging frame members, wheels carried by said diverging members, and said seat carrying and diverging members being removable as a unit from said front member.

Signed my me, this 19th day of March, 1919.

EDWARD J. HEMINGTON.